United States Patent
Laurenceau

(12)
(10) Patent No.: US 6,362,215 B1
(45) Date of Patent: Mar. 26, 2002

(54) COMPOSITION FOR LAYING HENS CONTAINING CALCIUM L-PIDOLATE

(76) Inventor: Remy Laurenceau, 140 avenue Felix Vincent, 44700 Orvault (FR)

( * ) Notice: Subject to any disclaimer, the term of this patent is extended or adjusted under 35 U.S.C. 154(b) by 0 days.

(21) Appl. No.: 09/743,285

(22) PCT Filed: Jul. 5, 1999

(86) PCT No.: PCT/FR99/01619

§ 371 Date: Mar. 7, 2001

§ 102(e) Date: Mar. 7, 2001

(87) PCT Pub. No.: WO00/02461

PCT Pub. Date: Jan. 20, 2000

(30) Foreign Application Priority Data

Jul. 8, 1998 (FR) ............................................ 98 08743

(51) Int. Cl.$^7$ ............................................... A61K 31/40
(52) U.S. Cl. ....................................... 514/423; 548/534
(58) Field of Search ............................ 514/423; 548/534

(56) References Cited

U.S. PATENT DOCUMENTS 4,921,971 A * 5/1990 Krimmer et al. ............ 548/534
6,103,276 A * 8/2000 Pilgrim et al. ................. 426/2
6,203,827 B1 * 3/2001 Katsukura ..................... 426/74

FOREIGN PATENT DOCUMENTS

DE 3735264 * 8/1988 ......... C07D/207/28
FR 2724844 * 3/1996 .......... A61K/33/10

OTHER PUBLICATIONS

Chandramoni et al, Br. Poult. Sci., vol. 39, #4, pp. 544–548 (abstract), Sep. 1998.*
Damron et al, Poult. Sci., vol. 74, #5, pp. 784–787 (abstract), May 1995.*
Shen et al, Poult. Sci., vol. 52, #2, pp. 676–682, Mar. 1973.*
Austic, Poult. Sci., vol. 52, #2, pp. 801–803, Mar. 1973.*

* cited by examiner

*Primary Examiner*—James H Reamer
(74) *Attorney, Agent, or Firm*—Young & Thompson

(57) ABSTRACT

The invention concerns the use of calcium L-pidolate for obtaining an agent improving the quality of eggshells and a composition capable of being administered to laying hens. Said composition is characterized in that it contains as active element for improving the quality of eggshells, in particular firmness and appearance, at least calcium L-pidolate. The invention is applicable to poultry farming.

7 Claims, 1 Drawing Sheet

SINGLE FIGURE

Table 1

| Treatments | Eggs gathered per day | % downgraded | Observations colors and appearance of shell |
|---|---|---|---|
| 1) Results before treatment:<br>    week 49<br>    week 54 | 16,400<br>15,200 | 3.3<br>4.9 | |
| 2) Week 55 to 57<br>    150 ppm calcium<br>    L-pidolate | 15,100 | 2.9 to 3.0 | . Color effect<br>. Fewer white eggs |
| 3) Treatment 58th week 300 ppm calcium L-pidolate<br>    1st day 20/11<br>    2nd day 21/11<br>    3rd day 22/11 | 15,140<br>15,200<br>15,180 | 2.91<br>2.56<br>2.76 | . Darker eggs<br>. Smoother shells |
| 4) After treatment 25/11<br>    Results of 26/27/11 | 15,200<br>15,150 | 3.90<br>4.30 | . The quality decreases from the second day but the color effect persists 8-10 days |

COMPOSITION FOR LAYING HENS CONTAINING CALCIUM L-PIDOLATE

The present invention relates generally to the use of calcium L-pidolate for obtaining an agent improving the quality of egg shells, in particular mechanical resistance and appearance, and, in particular a composition administrable to laying poultry so as to improve the quality of the shell of the eggs produced by said poultry.

Poultry raising has for several years been transformed into intensive industrial activity to the detriment of the conditions of raising (reduction of space, absence of natural light, etc.). This development translates for adult laying poultry into a decrease of the quality of the shells of the laid eggs. This drop in quality of the egg shells, and, in particular, of the mechanical resistance of said shells, has given rise to a substantial increase in the percentage of broken, cracked or microcracked eggs, giving rise to a substantial loss in the product in the course of transportation. Moreover, this reduction of the quality of the egg shells requires the breeder to reduce the productive life of the laying poultry because this decrease of the quality shows up most particularly after the 60th week of the life of the laying poultry.

Although the process for the development of the egg shell is not perfectly well known, it has nevertheless been shown that a supplemental content of nutritive elements, in particular calcium, phosphorus and vitamin D3 in the laying poultry feed could have beneficial effects on the functional properties of the shell. This is why different food supplements have been produced. Such compositions are particularly described in the patents FR-A-2.354.056, EP 0 383 116, EP 0 402 878, EP 0 594 862, WO 96/35339, FR-A-2.633.158.

As shown by the above list of documents, the solutions are diverse and varied. However, all these solutions have until now shown their limits because, beyond the doses prescribed in the above documents, there is generally obtained no supplemental effect on the mechanical resistance of the shell. Moreover, each of these above-proposed compositions has drawbacks connected either with the dosage of the active elements to be used, or to the difficulty of using the active element because of the intrinsic characteristics of said active element, or to the administration of this active element because of the cost of this active element which is not returned by the laying poultry. Such drawbacks give rise either to economic restraints connected to the doses and accordingly to the costs arising from such supplements, or to technical problems connected for example with the machines necessary for the production of the compositions, or to problems of the laying poultry refusing to eat it.

An object of the present invention is therefore to provide as an agent improving the quality, in particular the mechanical resistance and the appearance of egg shells, a calcium organo salt, never used until now in animal feed.

Another object of the present invention is to provide a composition administrable to laying poultry so as to improve the quality, in particular the mechanical resistance, the resistance to bacterial contamination and the appearance of the egg shells, this composition, simple to prepare, containing the tasteless active element in a very low quantity.

Another object of the present invention is to provide a composition administrable to laying poultry so as to improve the quality, in particular the mechanical resistance and appearance of the egg shells whose active element acts immediately, from the first day of its administration to the laying poultry.

To this end, the invention also has for its object the use of calcium L-pidolate for obtaining an agent improving the quality of egg shells, in particular the mechanical resistance and the appearance.

The invention also has for its object a composition administrable to laying poultry, characterized in that it contains, as active element improving the quality of the egg shells, in particular the mechanical resistance and the appearance, at least calcium L-pidolate.

The choice of calcium L-pidolate permits obtaining, at a very low dosage, an immediate effect on the functional properties of the shell. As a result, it is possible to provide a procedure perfectly adapted to mass poultry raising.

According to a preferred embodiment of the invention, the composition is constituted by a mixture of calcium L-pidolate and at least one generally hydrophobic support to form a feed pre-mixture to be directly incorporated with the rest of the laying poultry feed.

The feed composition is, because of the intrinsic characteristics of calcium L-pidolate, easy to prepare. The support is a component which avoids the risks connected with hygroscopy of the calcium L-pidolate and permits obtaining a homogeneous mixture.

The invention will be better understood from a reading of the following description of embodiments, with reference to the single figure which shows a table showing the influence of calcium L-pidolate on the percentage of downgraded eggs as well as on the color and appearance of the egg shells.

The invention consists in a discovery of the present applicant, namely, the immediate effect at low dosage of calcium L-pidolate on the sturdiness of egg shells. It is to be noted that, in the literature, calcium L-pidolate is also called calcium pyroglutamate or calcium pyrrolidone carboxylate. Similarly, the synthesis of calcium L-pidolate is well known. This synthesis comprises a first step of stereo-specific cyclization in aqueous medium of L-glutamic acid in L-pidolic acid, then a second step of reaction of the L-pidolic acid with a metallic oxide or carbonate in aqueous medium.

The mechanisms for incorporating calcium into the egg shell are poorly known. As a result, until now, the applicant could not explain precisely the mode of action of calcium L-pidolate, although the most probable hypothesis consists in presuming that the calcium L-pidolate fulfills principally a function of promoting the assimilation of calcium into the metabolism leading to the construction of the egg shell, and, secondarily, serving as a specific source of calcium in the feed supply of laying poultry.

The invention therefore consists, generally speaking, in using calcium L-pidolate for obtaining an agent improving the quality of the egg shell, in particular the mechanical resistance and appearance. Although the modes of use of this calcium L-pidolate can be various and sundry, the single manner of use which will be described hereafter is that in which the calcium L-pidolate is administered to laying poultry. However, other uses such as a direct application of calcium L-pidolate to the surface of the egg shell are also included in the present invention.

Calcium L-pidolate is a crystalline product soluble in water. Its characteristics therefore permit easily preparing a composition administrable to laying poultry and containing as active element improving the quality of the egg shell, in particular the mechanical resistance and the appearance, at least some calcium L-pidolate. This administration of calcium L-pidolate to laying poultry takes place preferably via the food of said poultry either in mixture with the complete foodstuff, or dissolved in the drinking water.

The most simple embodiment consists in preparing a composition constituted by a mixture of calcium L-pidolate and at least one support to form an alimentary pre-mixture directly incorporable in the rest of the food of the laying poultry. Because calcium L-pidolate is very hygroscopic, the solution which consists in preparing an alimentary pre-mixture is preferred. Thus, the calcium L-pidolate, because of its hygroscopic character, should be associated with a product which avoids any caking. This is more difficult in the case of a final foodstuff. Moreover, the incorporation of an additive by the foodstuff producer must be at least 5% to produce a homogeneous foodstuff. As a result, because of the recommended dosages, it is preferable to mix the calcium L-pidolate with a support to form an alimentary pre-mix which will be itself ultimately incorporated with other primary materials constituting the final foodstuff. Generally, in this alimentary pre-mix, the calcium L-pidolate is pulverulent and the support is in the dehydrated condition. By way of example can be cited a composition in which the support is dehydrated calcium carbonate, optionally supplemented by dehydrated algae flour or an alimentary clay. Thus, when the dosages of calcium L-pidolate to be administered to the laying poultry are relatively low, there is prepared a pre-mix constituted by pulverulent calcium L-pidolate: 3% and dehydrated powdered calcium carbonate: 97% (all percentages are by weight). An addition of 5 to 10% of this pre-mix into a foodstuff produces a final foodstuff with 150 to 300 ppm of calcium L-pidolate. When on the contrary the dosage of calcium L-pidolate to be administered to the animal is higher, there is prepared an alimentary pre-mix constituted by calcium L-pidolate: 16%, dehydrated powdered calcium carbonate: 84%. In this case, 5% of this pre-mix is added to a conventional foodstuff composition producing a foodstuff with 800 ppm of calcium L-pidolate and an addition of 7.5% of this pre-mix produces a foodstuff with 1200 ppm. In practice, the calcium L-pidolate is integrated into the daily feed of the laying fowl in a proportion permitting reaching a quantity of 150 to 1200 ppm of calcium L-pidolate in said ration according to the condition of degradation of the shell.

In the examples given above, it is possible to replace the use of dehydrated pure calcium carbonate by a mixture of calcium carbonate in the form of a dehydrated powder, in combination with dehydrated algae powder or by an alimentary clay. In all the examples described above, the calcium L-pidolate is present in the pulverulent condition in the form of crystals of the order of 1 micron.

However, other embodiments of calcium L-pidolate can be envisaged. Thus, the calcium L-pidolate can be encapsulated. Tests which have been conducted permit showing that, in this micro-encapsulated form, at an identical concentration of calcium L-pidolate, there is obtained a supplemental effect on the quality of the egg shell in the micro-encapsulated form compared to the pulverulent form. Micro-encapsulated calcium L-pidolate is, in the same manner as the powdered L-pidolate, mixed with calcium carbonate or a mixture of calcium carbonate and algae powder or an alimentary clay.

Other modes of administration of calcium L-pidolate to laying poultry can also be envisaged. Thus, the calcium L-pidolate can be in the pulverulent condition to be directly dissolved in the drinking water of the laying poultry. This calcium L-pidolate can also be contained in a composition constituted by a mixture of calcium L-pidolate, citric acid and sodium bicarbonate to form an effervescent composition to be incorporated into the drinking water of laying poultry. This effervescent composition could be constituted as follows:

Calcium L-pidolate: 50%
Citric acid+sodium bicarbonate: 50%.

There can also be envisaged the preparation of a composition constituted by a mixture of calcium L-pidolate as active element and an aqueous solution to form a directly drinkable solution incorporatable in the drinking water of the laying poultry. By way of example, the composition of this drinkable solution could be as follows: 150 to 200 g of calcium L-pidolate per liter of water. This solution would be incorporated in the drinking water of the laying poultry in a proportion of 0.6 to 4.5 liters per 1000 liters of drinking water.

The three embodiments described above, in which are used the drinking water of the laying poultry to administer the calcium L-pidolate to said laying poultry, can be in a solution complementary to a mode of administration in which the calcium L-pidolate is administered in mixture with the foodstuff.

To show the effectiveness of calcium L-pidolate, tests have been conducted in a henhouse provided with static ventilation and constituted by 50×35 cm wire-bottom cages, each for five hens. The test was carried out on 19,300 hens. It took place at the 19th week, on hens weighing 1.650 kg. The results of this test are set forth in Table 1. The downgraded percentage corresponds to the percentage of eggs with cracked shells, which shell having been carefully examined by candling so as to detect any rupture of the shell (cracks, holes, etc.). The percentage of uncracked egg shells was computed from eggs on which no shell rupture was observed by candling. For each test, the calcium L-pidolate content was noted. The calcium content of other nutrient elements was reduced to take account of the calcium content provided by means of the L-pidolate so as to prove that the result obtained was not connected to the supplemental calcium supply. As shown in Table 1, as soon as the day after the day in which the calcium L-pidolate was administered to the laying hens, there was noted a decrease of the percentage of downgraded eggs. It will moreover be seen that the effect of calcium L-pidolate on the quality, in particular the mechanical strength of the egg shells, decreased and disappeared completely as soon as the day after the end of treatment. On the contrary, the improvements provided by calcium L-pidolate, in particular on the color of the egg in terms of pure white eggs or a chalky appearance, persisted eight to ten days after stopping treatment. As the result is immediately quantifiable during sorting of the eggs at the producer, it is easy to adjust the calcium L-pidolate supplement. Tests shown in FIG. 1 were carried out in winter during the period October–November. These tests show that administration of calcium L-pidolate to laying poultry permits maintaining the percentage of downgraded eggs at a substantially constant value.

The decrease in quality of the shell increases between the 55th and 65th week. The hens are generally sacrificed at 68 to 70 weeks. Other tests have shown that the decrease in quality of the shell between the 60th week and the 72nd week can be stabilized by supplying calcium L-pidolate. As a result, the duration of exploitation of the hen can thus be prolonged so as to improve the profit of raising by reducing the hen/egg cost.

In tests carried out according to Table 1, the calcium L-pidolate was administered to laying hens in their feedstuff after preparation of a pre-mix according to that which was described above. The tests show clearly the effect of calcium L-pidolate on the ruggedness of the shell, in particular on its mechanical resistance and secondarily on its appearance. The different tests permit reaching the following conclusions as to use:

the recommended dosage of calcium L-pidolate in the foodstuff varies between 150 and 1200 ppm. The factors to be considered are:

the age of the hens at the beginning of treatment and then in the course of treatment; the content increases with age;

the desired quality of the shell;

the time of distribution: maximum effectiveness being obtained when consumption takes place at the end of the day, 4 to 5 p.m.;

the surrounding temperature.

The different tests make it seem that the administration of calcium L-pidolate should begin with the 45th week in summer and the 50th week in winter.

The quantities of incorporation can be as follows:
Beginning of treatment:
45th week in summer–50th week in winter: 150–200 ppm

| | |
|---|---|
| 50th–55th week | 200 ppm |
| 55th–60th week | 200 to 300 ppm |
| 60th–65th week | 200 to 400 ppm |
| 65th–70th week | 400 to 800 ppm |

Thereafter: prolongation of the duration of exploitation: 800–1200 ppm. It should be noted that important differences are observed between operations of raising. The quantity of incorporation should therefore be modified as a function of results.

Obviously, the numerical values given above are given only by way of example and in no way limit the scope of the invention.

What is claimed is:

1. A method of improving mechanical resistance and appearance of egg shells, comprising administering to laying poultry or applying directly to unbroken eggs, an effective amount of a comprising containing calcium L-pidolate.

2. A method according to claim 1, wherein the calcium L-pidolate is first admixed with a support to form an alimentary pre-mix, and said alimentary pre-mix is subsequently included in poultry feed that is fed to said poultry.

3. A method according to claim 1, wherein said calcium L-pidolate is fed to said poultry in poultry feed having a concentration of 150 to 1200 ppm of calcium L-pidolate.

4. A method according to claim 1, wherein said calcium L-pidolate is admixed with drinking water having a concentration of 90 to 900 mg of calcium L-pidolate per liter.

5. Composition for oral administration to laying poultry, which contains, as an active element improving mechanical resistance and appearance of egg shells, at least calcium L-pidolate, the calcium L-pidolate being integrated either in the daily food of the laying poultry in a proportion permitting achieving a quantity of 150 to 1200 ppm of calcium L-pidolate in said feed or in the drinking water of the laying poultry in a proportion permitting achieving a quantity of 90 to 900 mg of calcium L-pidolate per liter of drinking water.

6. Composition according to claim 5, wherein said calcium L-pidolate is integrated into the daily food of the laying poultry.

7. A composition as claimed in claim 5, wherein said calcium L-pidolate is integrated into the drinking water of said laying poultry.

* * * * *